March 23, 1926.

A. HESS

BACKFLOW CHECK

Filed Nov. 13, 1924

1,577,637

INVENTOR.
Arthur Hess
BY Nuttall and Wallace
ATTORNEYS.

Patented Mar. 23, 1926.

1,577,637

UNITED STATES PATENT OFFICE.

ARTHUR HESS, OF LOS ANGELES, CALIFORNIA, ASSIGNOR OF ONE-HALF TO SAMUEL L. MARSH, OF LOS ANGELES, CALIFORNIA.

BACKFLOW CHECK.

Application filed November 13, 1924. Serial No. 749,628.

*To all whom it may concern:*

Be it known that I, ARTHUR HESS, a citizen of the United States, and resident of Los Angeles, in the county of Los Angeles, State of California, have invented new and useful Improvements in a Backflow Check, of which the following is a specification.

This invention relates to plumbing fittings and contemplates the provision of an automatic check which may be located at selected points and whereby a free flow of liquid is permitted. Thus, the device is of a character adaptable for use with fixtures to prevent waste or sewage from backing up into the fixtures.

It is an object of this invention to provide a fitting which will not obstruct or impede the flow of waste or fluid in a discharge direction, offering a clear unobstructed passage, but will completely close the passage against back flow. Another object of this invention is to provide a fitting having means to connect a flushing and cleaning device thereto for injecting fluid into the system under pressure, and whereby the fixtures or other parts are cut off by the system filling with the flushing fluid.

Figure 1:
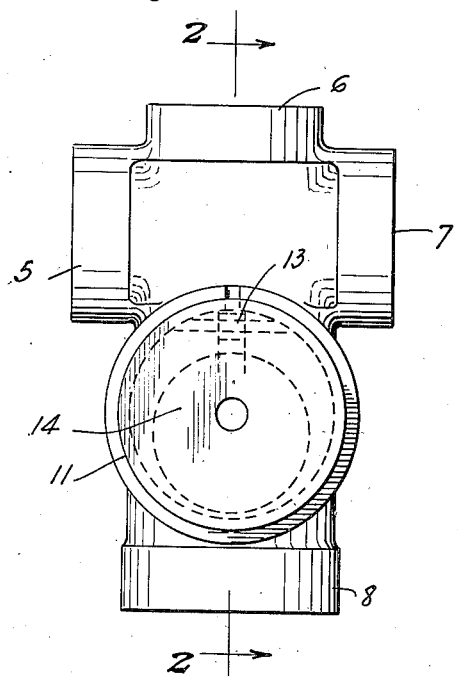
Figure 2:
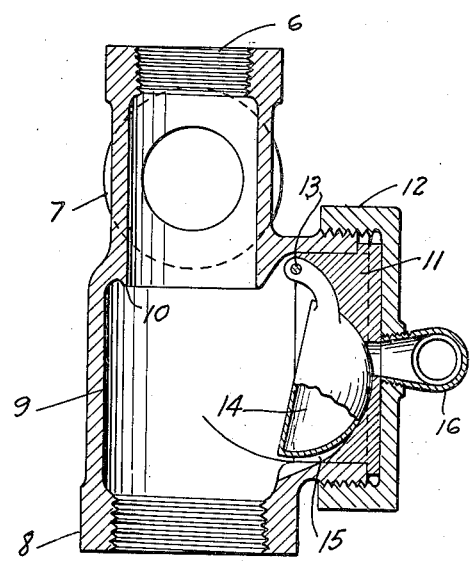
Figure 3:
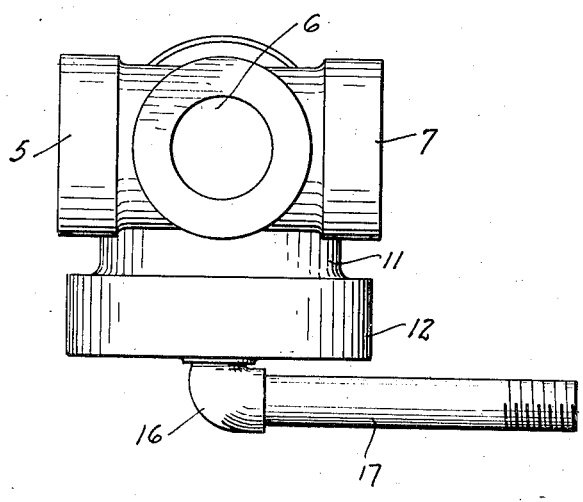

These objects together with other objects and corresponding accomplishments are obtained by means of the embodiment of my invention illustrated in the accompanying drawing, in which:

Fig. 1 is an elevation of a four way or cross fitting equipped with my invention; Fig. 2 is a section as seen on the line 2—2 of Fig. 1; and Fig. 3 is a plan view.

Referring more particularly to the drawing, the cross fitting shown herein is of a type which is useful in many places, as will be obvious to one familiar with the art. It comprises three branches 5, 6, and 7 adapted to be connected to fixtures or lines leading thereto, and a branch 8 adapted to be connected to the discharge line. The bore of the branch is enlarged as indicated by 9 to form a chamber with a seat 10 therein. An opening and extension is provided on the face of the fitting to form a valve chamber in which is disposed a plug 11, having a valve recession chamber communicating with the chamber 9. The extension is externally threaded to receive a cap 12 which holds the plug in place. A pin 13 is suitably mounted in the plug and pivotally supported thereon is a float check 14 which may be of hemispherical shape. Thus, a removable valve unit is provided. The float valve or check is so mounted that, if swung upwardly, it will engage seat 10 and close communication between branches 5, 6, 7 and branch 8. The float is also mounted so that it hangs slightly off center so that upon the chamber 9 filling with liquid, the latter enters a channel 15 and the float check tends to swing upwardly against its seat. An elbow nipple 16 is connected in the cap 12 and communicates with the recession chamber through an opening therein. A pipe 17 is secured to elbow 16. Normally the pipe 17 may be capped at the end when the fitting is in place.

Suppose that stoppage occurs in the system beyond the fitting and waste liquid or matter begins to back up. As the waste matter begins to rise in chamber 9 and the valve recession chamber, float 14 swings toward its seat 10, thereby closing the passage therethrough. This prevents sewage or waste liquid from backing up into the fixtures. If it is desired to clean out the system by forcing fluid such as water thereinto, a force pump is connected to pipe 17. The flushing fluid is then pumped into the system, whereupon float check 14 will be raised and seated closing off communication with the fixtures on the other side thereof.

What I claim is:

1. A fitting having a way therethrough for the passage of liquid, a recession chamber at the side of said fitting, a float check pivotally suspended in said chamber substantially filling the same and arranged to be swung outwardly into said passage to close the same by back flow, and a clean-out connection mounted to communicate with said chamber back of said check.

2. A fitting having a way therethrough for the passage of fluid enlarged and provided with a seat at said enlargement, a recession chamber in said fitting at said enlargement, a float check pivotally suspended in said side chamber substantially filling the same and arranged to be swung onto said seat to close the same by back flow, and a clean-out connection disposed for communication with said chamber.

In witness that I claim the foregoing I have hereunto subscribed my name this 3rd day of November, 1924.

ARTHUR HESS.